(12) United States Patent
Ramseyer et al.

(10) Patent No.: US 11,365,997 B2
(45) Date of Patent: Jun. 21, 2022

(54) CORIOLIS MEASURING DEVICE

(71) Applicant: Endress+Hauser Flowtec AG, Reinach (CH)

(72) Inventors: Severin Ramseyer, Münchenstein (CH); Benjamin Schwenter, Breitenbach (CH)

(73) Assignee: ENDRESS+HAUSER FLOWTEC AG, Reinach (CH)

(*) Notice: Subject to any disclaimer, the term of this patent is extended or adjusted under 35 U.S.C. 154(b) by 0 days.

(21) Appl. No.: 16/978,212

(22) PCT Filed: Mar. 6, 2019

(86) PCT No.: PCT/EP2019/055567
§ 371 (c)(1),
(2) Date: Sep. 4, 2020

(87) PCT Pub. No.: WO2019/170742
PCT Pub. Date: Sep. 12, 2019

(65) Prior Publication Data
US 2021/0041278 A1 Feb. 11, 2021

(30) Foreign Application Priority Data
Mar. 6, 2018 (DE) .................. 10 2018 105 089.5

(51) Int. Cl.
*G01F 1/84* (2006.01)
*G01N 9/32* (2006.01)

(52) U.S. Cl.
CPC .......... *G01F 1/8472* (2013.01); *G01F 1/8422* (2013.01); *G01F 1/8427* (2013.01); *G01F 1/8431* (2013.01); *G01N 9/32* (2013.01)

(58) Field of Classification Search
CPC .... G01F 1/8418; G01F 1/8422; G01F 1/8427; G01F 1/8431; G01F 1/8468; G01F 1/8472
See application file for complete search history.

(56) References Cited

U.S. PATENT DOCUMENTS

| 6,223,605 B1 | 5/2001 | Koudal et al. |
| 2011/0041623 A1 | 2/2011 | Lanham et al. |
| (Continued) | | |

FOREIGN PATENT DOCUMENTS

| CN | 1749704 A | 3/2006 |
| CN | 1890537 A | 1/2007 |
| (Continued) | | |

OTHER PUBLICATIONS

Lee, C. K., Su, Y. P., Hui S. Y. R., Multilayer Stacked Coreless Printed Spiral Winding Inductor with Wide Frequency Bandwidth, IEEE, 2009, 8 pp. (1002-1009).

*Primary Examiner* — Erika J. Villaluna
(74) *Attorney, Agent, or Firm* — Christopher R. Powers; Endress+Hauser (USA) Holding Inc.

(57) ABSTRACT

A Coriolis measuring device for measuring volume flow or density of a medium flowing through a measuring tube is disclosed, the device comprising: the measuring tube for conveying the medium; at least one exciter, which is adapted to excite the measuring tube to execute oscillations; at least one sensor, which is adapted to register the oscillations of the measuring tube; an electronic measuring/operating circuit, which is adapted to operate the exciter as well as the sensor and to determine and to output flow and/or density measurement values; wherein the electronic measuring/operating circuit has an electronics board, wherein at least one exciter has a stationary exciter element, and/or wherein at least one sensor has a stationary sensor element, wherein at (Continued)

least one stationary exciter element and/or at least one stationary sensor element is integrated into the electronics board.

12 Claims, 2 Drawing Sheets

(56) References Cited

U.S. PATENT DOCUMENTS

| | | |
|---|---|---|
| 2015/0082880 A1 | 3/2015 | Allen |
| 2015/0355008 A1 | 12/2015 | Werbach et al. |
| 2021/0072062 A1* | 3/2021 | Chatzikonstantinou ............... G01F 1/8477 |

FOREIGN PATENT DOCUMENTS

| | | |
|---|---|---|
| CN | 1934425 A | 3/2007 |
| CN | 102980621 A | 3/2013 |
| DE | 102010061720 A1 | 5/2012 |
| DE | 102015120087 A1 | 5/2017 |
| DE | 102015122146 A1 | 6/2017 |
| DE | 202017006709 U1 | 2/2018 |
| EP | 1431719 A1 | 6/2004 |
| WO | 2015076676 A1 | 5/2015 |

* cited by examiner

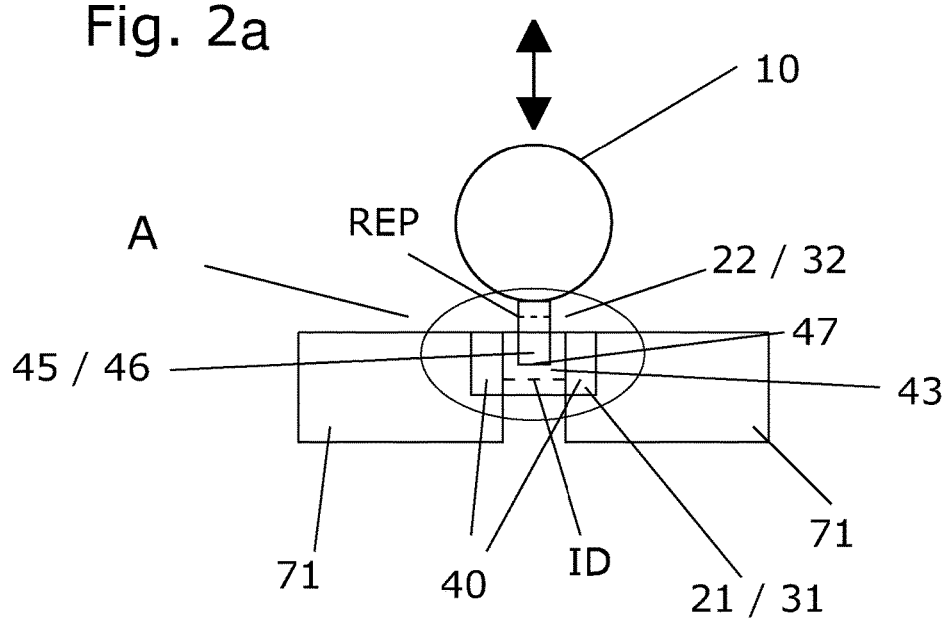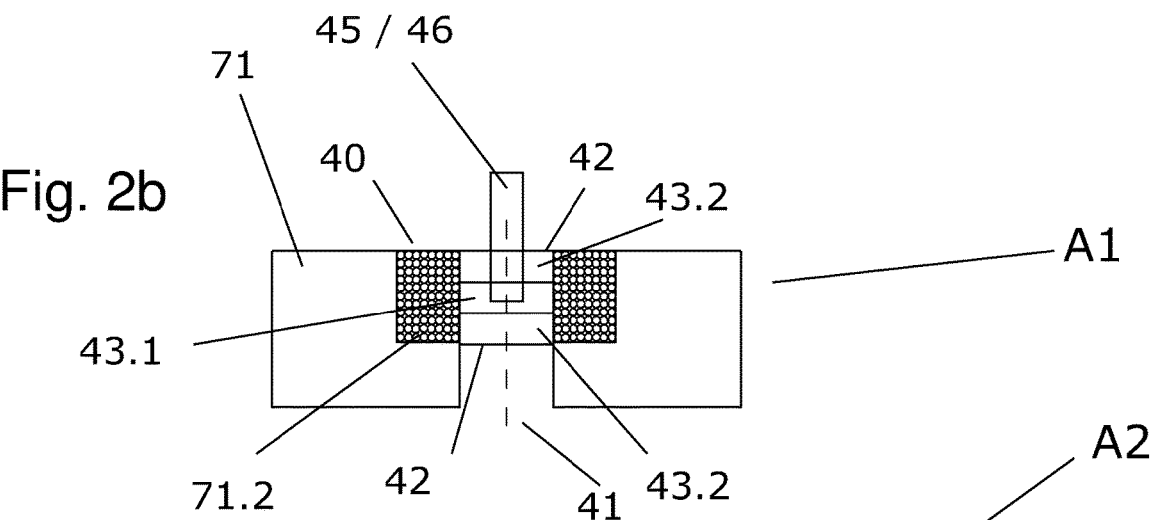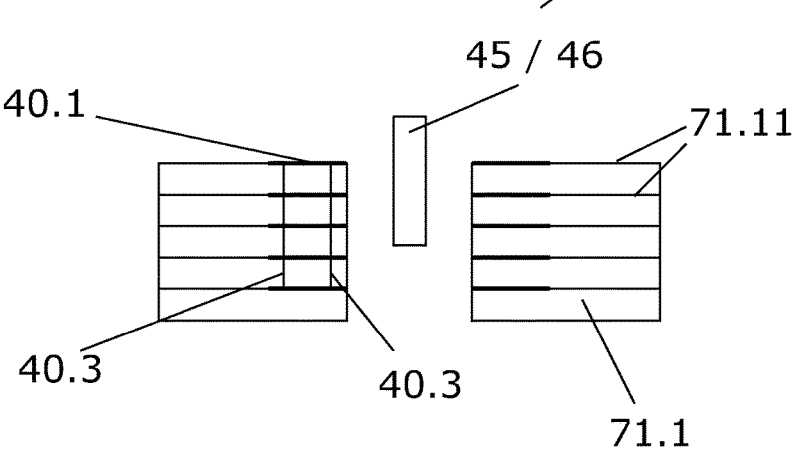

US 11,365,997 B2

CORIOLIS MEASURING DEVICE

CROSS-REFERENCE TO RELATED APPLICATIONS

The present application is related to and claims the priority benefit of German Patent Application No. 10 2018 105 089.5, filed on Mar. 6, 2018, and International Patent Application No. PCT/EP2019/055567, filed on Mar. 6, 2019, the entire contents of which are incorporated herein by reference.

TECHNICAL FIELD

The invention relates to a Coriolis measuring device for measuring volume flow or density of a medium flowing through a measuring tube.

BACKGROUND

A Coriolis measuring device can register, for example, flow velocity or density of a medium flowing through at least one measuring tube of the device. This is accomplished using the fact that oscillations impressed on the at least one measuring tube change in characteristic manner relative to a reference. The oscillations are advantageously transferred to the measuring tube via electrical or magnetic apparatuses and also registered in this way.

Such Coriolis measuring devices are produced in various embodiments, among others, also in variants with compact measuring tubes, such as, for example, shown in WO2015076676A1. Oscillation exciters and oscillation sensors are, in such case, relatively bulky, and this prevents further compacting and is accompanied by increased material costs.

SUMMARY

An object of the invention is to provide a more compact Coriolis measuring device, which is more favorably manufacturable.

The object is achieved by a Coriolis measuring device as defined in independent claim 1.

A Coriolis measuring device of the invention for measuring volume flow or density of a medium flowing through a measuring tube comprises:
  the measuring tube for conveying the medium;
  at least one exciter, which is adapted to excite the measuring tube to execute oscillations;
  at least one sensor, which is adapted to register oscillations of the measuring tube; and
  an electronic measuring/operating circuit, which is adapted to operate the exciter as well as the sensor and to determine and to output flow and/or density measurement values,
  wherein the electronic measuring/operating circuit includes an electronics board,
  wherein at least one exciter has a stationary exciter element, and/or wherein at least one sensor has a stationary sensor element,
  wherein at least one stationary exciter element and/or at least one stationary sensor element are/is integrated into the electronics board,
  wherein furthermore arranged on the electronics board are electronic components of the electronic measuring/operating circuit for operating the Coriolis measuring device.

In an embodiment, the stationary exciter element comprises a coil and the stationary sensor element comprises a coil.

In an embodiment, at least one exciter includes a movable exciter element, and/or wherein at least one sensor includes a movable sensor element,
  wherein the movable exciter element and/or the movable sensor element are/is arranged at the measuring tube and follow(s) its oscillatory movements.

In an embodiment, the movable exciter element or the movable sensor element is a permanent magnet or electromagnet, which is adapted to move along a coil axis of its coil perpendicularly to the coil.

In an embodiment, a coil occupies an internal volume along its coil axis between faces of the coil, wherein the internal volume has a central region and two outer regions enclosing the central region,
  wherein the movable exciter element has a lateral surface facing the coil, wherein the movable exciter element is so arranged on the measuring tube that the lateral surface is located in the central region in a resting state of the measuring tube.

In this way, it is assured that a maximum force is exerted on the exciter element, and a maximum sensitivity of the coil relative to a movement of the movable sensor element is assured.

In an embodiment, a coil has turns and is adapted to produce a magnetic field along the coil axis perpendicularly to the electronics board, wherein the number of turns is greater than 10, and, especially, greater than 30 and preferably greater than 100.

The greater the number of turns, the greater is an electromagnetic coupling between stationary exciter-, sensor element and movable exciter-, sensor element.

In an embodiment, the electronics board is a multilayer board having a plurality of board layers, which are stacked and connected via their faces with neighboring board layers,
  wherein a coil has a plurality of subcoils and at least two coil contacts, which subcoils are arranged on different faces, wherein coil contacts are arranged on ends of the coil, and wherein the board has first vias, which are adapted to connect adjoining subcoils electrically with one another.

In this way, the stationary sensor and exciter elements can be built up especially compactly.

In an embodiment, a coil is a wound coil and is arranged in a cavity of the electronics board.

In this way, the stationary sensor and exciter elements can be built up especially compactly.

In an embodiment, there are arranged on the electronics board, furthermore, electronic components of the electronic measuring/operating circuit for operating the Coriolis measuring device.

In an embodiment, a coil is connected with the electronic measuring/operating circuit by means of electrically conductive connections arranged on or in the electronics board.

In an embodiment, the measuring device has a housing with a housing wall, wherein the housing wall encloses a housing chamber, wherein the housing includes at least two measuring tube passageways located in the housing wall,
  wherein the housing is adapted to house the electronics board as well as the measuring tube, at least between the measuring tube passageways.

In an embodiment, the Coriolis measuring device includes a counter-oscillation plate, which is adapted to oscillate oppositely to the measuring tube,
  wherein there are arranged on the counter-oscillation plate measuring tube holders, which are adapted to hold the measuring tube, wherein the measuring tube is adapted to oscillate between the measuring tube holders, wherein the counter-oscillation plate oscillation is mounted by means of vibration-damping bearings on the housing wall.

In an embodiment, the measuring tube includes an inlet having an inlet end and an outlet having an outlet end, wherein the inlet end and the outlet end are led especially oscillation dampingly through the measuring tube passageways.

In an embodiment, the electronics board is accommodated oscillation dampingly on the housing wall.

In an embodiment, a permanent magnet has perpendicularly to a longitudinal axis a radial extent greater than 0.1 mm and preferably greater than 0.2 mm and, especially, greater than 0.3 mm and less than 5 mm and preferably less than 4 mm and, especially, less than 3 mm, wherein a coil has an inner diameter, which is at least 0.1 mm and preferably at least 0.2 mm and, especially, at least 0.3 mm and/or at most 1 mm, and preferably at most 0.8 mm and, especially, at most 0.7 mm greater than the radial extent.

In an embodiment, the Coriolis measuring device is a single tube, Coriolis measuring device, wherein the measuring tube has between the measuring tube holders at least two bends, which extend relative to their bending centers over an angle of arc of at least 120 degree and, especially, at least 135 degree and preferably at least 150 degree.

This measurement tube structural form is especially compact.

BRIEF DESCRIPTION OF THE DRAWINGS

The invention will now be described based on examples of embodiments presented in the appended drawing, the figures of which show as follows:

FIGS. 2a-2c show schematic details of a flow measuring device of the present disclosure with two exemplary forms of embodiment.

DETAILED DESCRIPTION

Figure 1:
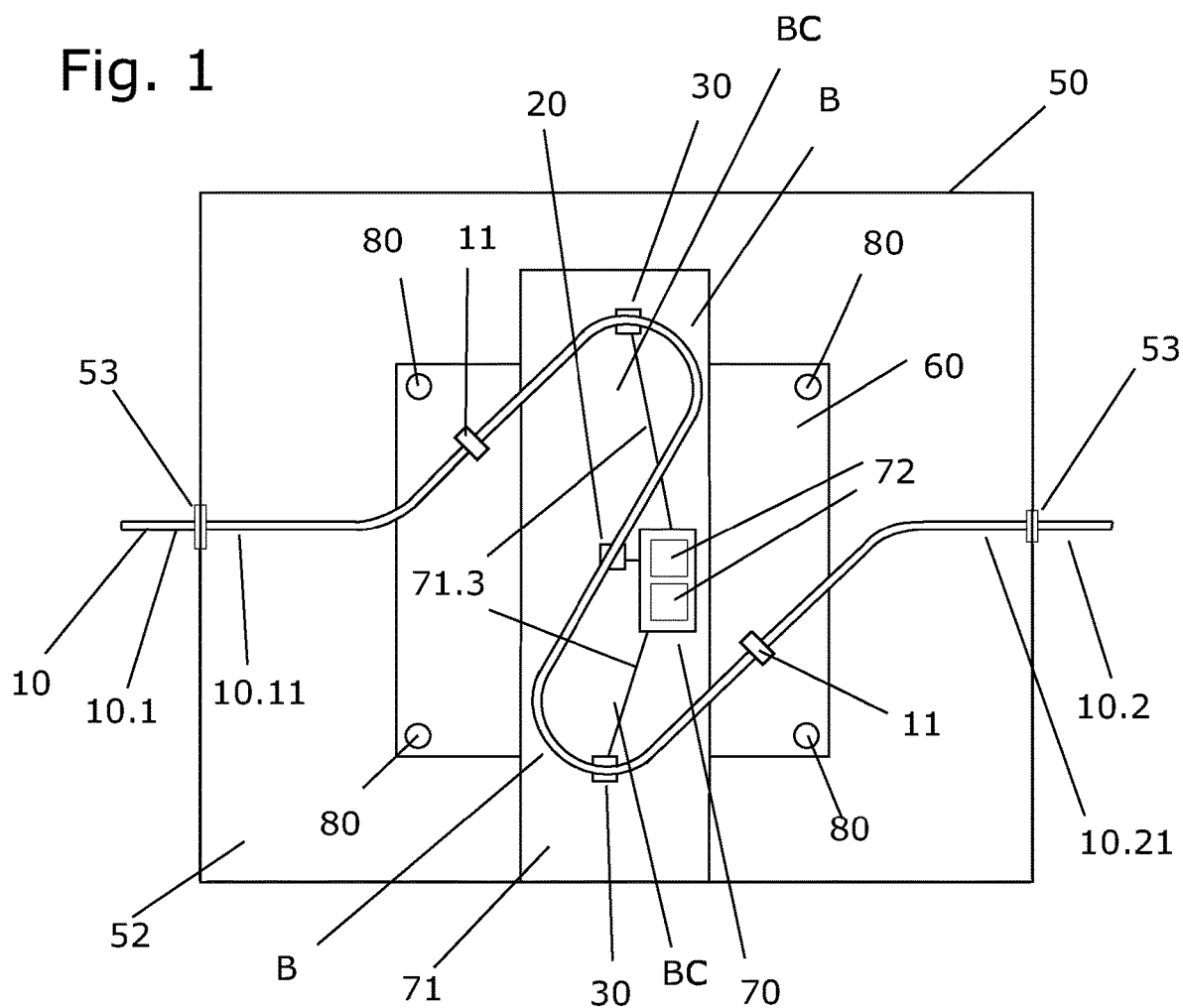
FIG. 1 shows a schematic construction of a Coriolis measuring device of the present disclosure.

FIG. 1 shows the construction of a Coriolis measuring device 1 of the invention. Measuring device 1 includes a measuring tube 10, an electronics board 71 and a counter-oscillation plate 60. The measuring tube is arranged on the counter-oscillation plate 71 by means of measuring tube holders 11 and held by these measuring tube holders 11. The electronics board includes an exciter 20 for producing measuring tube oscillations, and two sensors 30 for registering measuring tube oscillations produced by the exciter. The number of exciters and sensors here is by way of example, and not to be construed as limiting. The Coriolis measuring device includes an electronic measuring/operating circuit 70 with electronic components 72, which are arranged on the electronics board 71. The electronic measuring/operating circuit is adapted to operate the exciter as well as the sensor and to determine and to output flow and/or density measurement values. The electronic measuring/operating circuit is, in such case, connected by means of electrically conductive connections 71.3 with the exciter and with the sensors. The electronics board is arranged in a housing chamber 52 of a housing 50, which housing chamber is formed by a housing wall 51. The electronics board 71 is, in such case, mounted on the housing wall 51, wherein preferably a vibration-damping bearing of the electronics board on the housing wall is provided, so that the electronics board and the housing are vibrationally decoupled. The measuring tube holders 11 are mounted on the counter-oscillation plate 60 and can act vibration-damping. The counter-oscillation plate is vibration-damping by means of bearings 80 mounted on the housing wall.

The measuring tube is, in such case, adapted to oscillate between the measuring tube holders 11. The measuring tube includes an upstream directed inlet 10.1 with an inlet end 10.11 and a downstream directed outlet 10.2 with an outlet end 10.21, wherein the measuring tube extends by means of the inlet end and outlet end through measuring tube passageways 53 in the housing wall 51, wherein the measuring tube passageways act ideally vibration damping and decouple the measuring tube acoustically from the housing and from the environment. The measuring tube includes relative to bend centers BC two bends B, which extend relative to the bend centers over angles of arc of at least 120 degree and, especially, at least 135 degree and preferably at least 150 degree. In this way, the Coriolis measuring device can be embodied compactly. Embodiments of the exciter and sensor according to the invention are shown in FIG. 2.

FIG. 2 shows schematically by way of a structural sketch the construction of an exciter 20, or sensor 30, according to the invention and its arrangement relative to the electronics board 71 and the measuring tube 10. A exciter 20 of the invention, or sensor 30 of the invention, includes a movable exciter element 22, or movable sensor element 32, as well as a stationary exciter element 21, or stationary sensor element 31, wherein the movable exciter-, or sensor element is arranged at the measuring tube and follows its oscillatory movement, and wherein the stationary exciter-, or sensor, element is integrated into the electronics board. The stationary exciter-, or sensor, element integrated in the electronics board is, in such case, a coil 40, while the movable exciter-, or sensor element is, in such case, a permanent magnet 45 or an electromagnet 46. The permanent magnet, or electromagnet, plunges up and down, in such case, in an internal volume 43 of the coil and includes a side surface 47 facing the coil, wherein an inner diameter ID of the coil is at least 0.1 mm and preferably at least 0.2 mm and, especially, at least 0.3 mm greater than a radial extent REP of the permanent magnet. The permanent magnet has perpendicularly to a longitudinal axis a radial extent REP greater than 0.1 mm and preferably greater than 0.2 mm and, especially, greater than 0.3 mm and less than 5 mm and preferably less than 4 mm and, especially, less than 3 mm.

The details A1 and A2 show by way of example two embodiments of the region of the structural sketch of the exciter, or sensor, labeled with A. A1 shows an embodiment, in the case of which the coil is placed in a cavity 71.2 of the electronics board 71. The coil occupies, in such case, as measured from its end faces 42, an internal volume 43, wherein the internal volume 43 has a central region 43.1 and two outer regions 43.2 enclosing the central region. In a resting state of the measuring tube, the side surface 47 is located in the central region 43.1. As a result, it is assured that, on the one hand, in the case of an exciter a maximum force is exerted on the movable exciter element, and, on the other hand, in the case of a sensor a maximum induction of an electrical voltage takes place in the coil. Alternatively to the embodiment shown in A1, the embodiment of A2 shows the coil applied on the electronics board. The electronics board can, such as shown here, have a plurality of printed circuit board layers 71.1, wherein a plurality of the layers have subcoils 40.1, which are electrically connected by means of vias 40.3. Equivalent to A1, the coil of A2 occupies an internal volume, which, for reasons of perspicuity, is not designated.

The invention claimed is:

1. A Coriolis measuring device for measuring volume flow or density of a medium flowing through a measuring tube, the measuring device comprising:
   the measuring tube configured to convey the medium;
   at least one exciter adapted to excite the measuring tube to execute oscillations;
   at least one sensor adapted to register the oscillations of the measuring tube; and
   an electronic measuring/operating circuit configured to operate the at least one exciter and the at least one sensor and to determine and output flow and/or density measurement values of the medium, the electronic measuring/operating circuit including an electronics board on which are arranged electronic components configured to operate the measuring device,
   wherein at least one exciter includes a stationary exciter element, comprising an exciter coil, and/or wherein at least one sensor includes a stationary sensor element, comprising a sensor coil,
   wherein at least one stationary exciter element and/or at least one stationary sensor element is integrated into the electronics board,
   wherein a respective coil of the exciter coil and/or the sensor coil has greater than 10 turns and is configured to produce a magnetic field along a respective coil axis perpendicular to the electronics board,
   wherein the electronics board is a multilayer board including a plurality of board layers with faces stacked and connected via their respective faces with neighboring board layers, and
   wherein the respective coil of the exciter coil and/or the sensor coil includes a plurality of subcoils and at least two coil contacts, which subcoils are arranged on different faces, wherein the at least two coil contacts are arranged on ends of the coil, and wherein the electronics board includes first vias adapted to connect adjoining subcoils electrically with each other.

2. The measuring device of claim 1, wherein at least one exciter includes a movable exciter element, and/or wherein at least one sensor includes a movable sensor element,
   wherein the movable exciter element and/or the movable sensor element are arranged at the measuring tube and follow the oscillations of the measuring tube.

3. The measuring device of claim 2, wherein the movable exciter element or the movable sensor element is a permanent magnet or electromagnet, which is adapted to translate along a coil axis of its corresponding coil perpendicular to the corresponding coil.

4. The measuring device of claim 3, wherein the corresponding coil defines an internal volume along its coil axis between faces of the corresponding coil, wherein the internal volume has a central region and two outer regions bordering the central region,
   wherein the movable exciter element and/or the movable sensor element have lateral surfaces facing their respective coils, wherein the movable exciter element is arranged on the measuring tube such that the lateral surface of the movable exciter element is disposed in the central region in a resting state of the measuring tube.

5. The measuring device of claim 3, wherein the permanent magnet has, perpendicular to a longitudinal axis, a radial extent greater than 0.1 mm and less than 5 mm, and wherein the respective coil has an inner diameter at least 0.1 mm greater than the radial extent.

6. The measuring device of claim 1, wherein the respective coil is connected with the electronic measuring/operating circuit via electrically conductive connections disposed on or in the electronics board.

7. The measuring device of claim 1, further comprising a housing having a housing wall which defines a housing chamber, wherein the housing includes at least two measuring tube passageways through the housing wall,
   wherein the housing is configured to house the electronics board and the measuring tube, at least between the measuring tube passageways.

8. The measuring device of claim 7, further comprising:
   a counter-oscillation plate disposed within the housing chamber, wherein the counter-oscillation plate is configured to oscillate opposite to the measuring tube; and
   measuring tube holders disposed on the counter-oscillation plate and adapted to retain the measuring tube as to enable the measuring tube to oscillate between the measuring tube holders,
   wherein the counter-oscillation plate is mounted by vibration-damping bearings to the housing wall.

9. The measuring device of claim 8, wherein the measuring device includes a single measuring tube, wherein the single measuring tube has at least two bends between the measuring tube holders, the two bends extending relative to their respective bending centers through an arc angle of at least 120 degrees.

10. The measuring device of claim 7, wherein the measuring tube includes an inlet with an inlet end and an outlet with an outlet end, wherein the inlet end and the outlet end are led through the measuring tube passageways.

11. A Coriolis measuring device for measuring volume flow or density of a medium flowing through a measuring tube, the measuring device comprising:
    the measuring tube configured to convey the medium;
    at least one exciter adapted to excite the measuring tube to execute oscillations;
    at least one sensor adapted to register the oscillations of the measuring tube; and
    an electronic measuring/operating circuit configured to operate the at least one exciter and the at least one sensor and to determine and output flow and/or density measurement values of the medium, the electronic measuring/operating circuit including an electronics board on which are arranged electronic components configured to operate the measuring device,
    wherein at least one exciter includes a stationary exciter element, comprising an exciter coil, and/or wherein at least one sensor includes a stationary sensor element, comprising a sensor coil,
    wherein at least one stationary exciter element and/or at least one stationary sensor element is integrated into the electronics board,
    wherein a respective coil of the exciter coil and/or the sensor coil has greater than 10 turns and is configured to produce a magnetic field along a respective coil axis perpendicular to the electronics board, and
    wherein the respective coil of the exciter coil and/or the sensor coil is a wound coil and disposed in a cavity of the electronics board.

12. The measuring device of claim 11, wherein the respective coil is connected with the electronic measuring/ operating circuit via electrically conductive connections disposed on or in the electronics board.

\* \* \* \* \*